May 9, 1939.   C. NESS   2,157,914
HYDRAULIC BACK PRESSURE ARRESTER
Filed Jan. 22, 1936
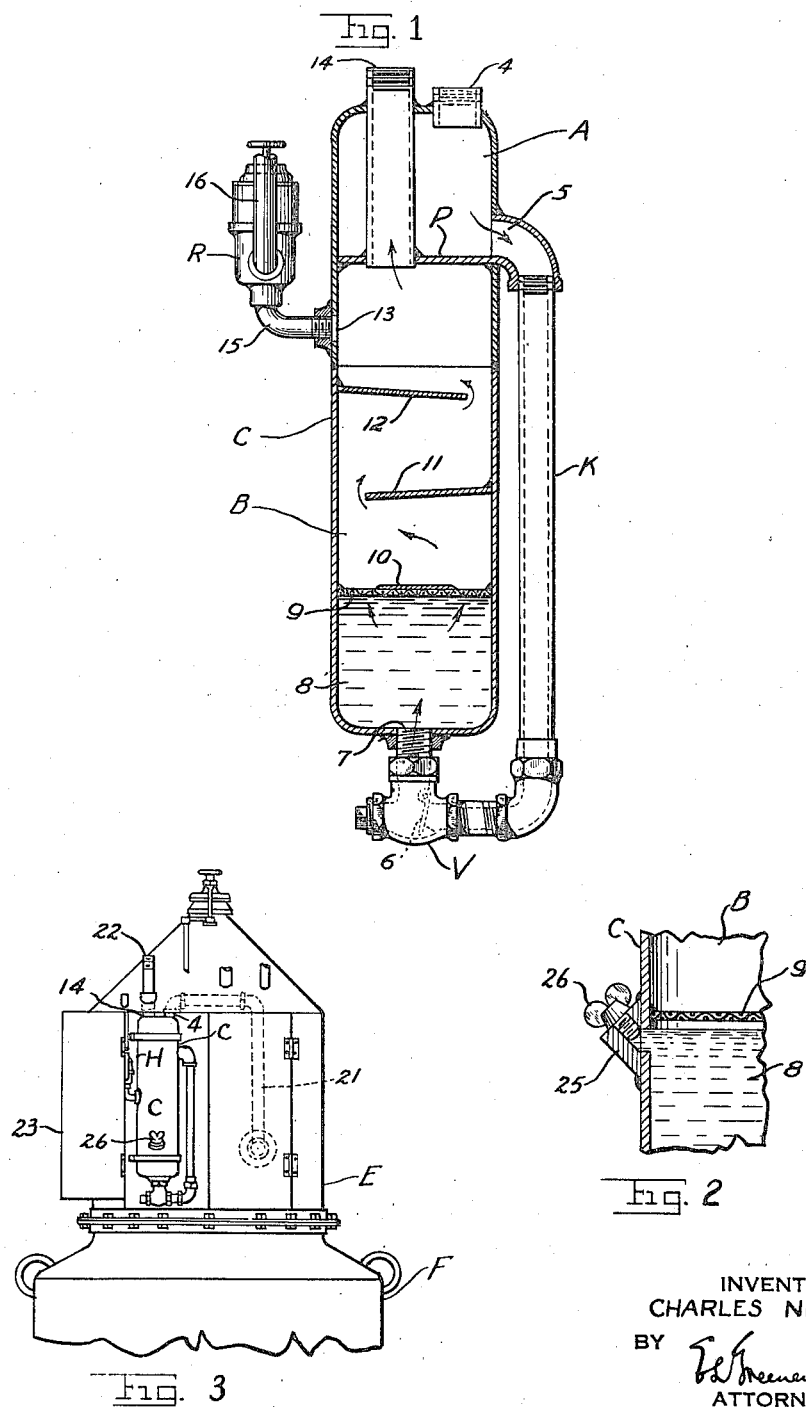
INVENTOR
CHARLES NESS
BY
ATTORNEY Patented May 9, 1939

2,157,914

UNITED STATES PATENT OFFICE 2,157,914

HYDRAULIC BACK PRESSURE ARRESTER

Charles Ness, Indianapolis, Ind., assignor to Oxweld Acetylene Company, a corporation of West Virginia Application January 22, 1936, Serial No. 60,164

7 Claims. (Cl. 48—192)

This invention relates to hydraulic back-pressure arresters which are employed in combustible gas supply lines to prevent the return flow of gas through the line to the source of supply of the combustible gas.

More specifically, this invention relates to hydraulic back-pressure arresters employed in acetylene or fuel-gas systems which supply an oxyacetylene or oxygen fuel-gas combustion apparatus. Such hydraulic back-pressure arresters, which are also termed flash-back arresters, are used to prevent a return flow of oxygen from the combustion apparatus to the acetylene generator and also to prevent a flash-back occurring in the combustion apparatus from traveling through the supply line back to the generator.

Hydraulic back-pressure arresters as employed in acetylene generating systems have heretofore usually included a liquid or water-sealed check valve at the inlet of a flash-back chamber interposed in the supply line between the acetylene generator and the combustion apparatus. In addition, a suitable pressure relief valve has usually been connected to the flash-back chamber to discharge into the atmosphere any undue amount of high pressure oxygen flowing back into the chamber or to relieve any excessive gas pressure developed by an explosion of an oxy-acetylene gas mixture that might have accumulated in the outlet piping of the system.

The operation of such apparatus is not entirely dependable because some commercial check valves leak and permit the water to be forced out of the hydraulic arrester back into the generator line and, in some instances, even into the generator itself. This may occur when the pressure at the outlet becomes greater than the pressure at the inlet of the arrester when the acetylene generator is opened for the purpose of recharging and the pressure within the generator is reduced to atmospheric, thus becoming less than the pressure of the gas in the fuel gas delivery line, or when an obstruction at the blowpipe nozzle or in the delivery system diverts high pressure oxygen into the fuel gas delivery line. In the event that the inlet pressure is lower than the outlet pressure for any considerable period of time, all of the sealing water at the check-valve will become lost and the arrester then will afford no protection since flashbacks or explosions will be free to travel through the arrester into the generator itself. The supply of sealing water at the check valve is also reduced by the moisture entrained by the gas bubbling through the water. Other undesirable loss of sealing water occurs when the volume and velocity of the acetylene delivered through the valve is great enough to violently agitate the water and to splash a considerable amount of water into the outlet of the arrester where it will subsequently either flow or be carried by the acetylene into the delivery line.

The objects of this invention, therefore, are to provide an improved hydraulic back-pressure arrester adapted for use with supply lines for combustion apparatus which will effectually prevent the loss of sealing liquid due to leakage back through the check-valve; to insure a reliable seal between the inlet and outlet of the hydraulic arrester; to reduce the loss of liquid due to entrainment of moisture by the combustible gas when flowing through the apparatus; and to prevent the loss of liquid due to splashing which occurs when the liquid becomes violently agitated due to the passage through the liquid of large volumes of combustible gas at a high velocity. These and other objects and the novel features of my invention will become apparent from the following specification and the accompanying drawing in which:

Fig. 1 is a vertical sectional view of apparatus embodying my invention;

Fig. 2 is a vertical sectional view illustrating more clearly the liquid inspection and filling plug which is positioned on the front of the hydraulic back-pressure arrester and therefore is not shown in Fig. 1; and Fig. 3 illustrates the apparatus shown in Fig. 1 applied to an acetylene generator such as is described and claimed in Patent No. 2,106,972 issued February 1, 1938, to M. P. DeMotte.

The improved hydraulic back-pressure arrester shown in Fig. 1 comprises a tubular metal casing C having a gas-tight partition P near the top, dividing the casing into an upper compartment A and a lower compartment B. The upper compartment has an inlet 4 at its upper end and an outlet 5 at its lower end while the lower compartment has an inlet 7 at its lower end and an outlet pipe 14, which may extend through the upper compartment, at its upper end. The outlet 5 of the upper compartment and the inlet 7 of the lower compartment may be connected by a pipe or passage K which includes a valve V having a swing-check 6. The lower compartment is adapted to hold a body of liquid 8 in its lower portion. Disposed at the normal level of the body of liquid is a filling and inspection hole (Fig. 2) through which the liquid may be introduced by means of a fitting 25 normally closed by a threaded stopper 26. Also disposed at the normal level of the body of liquid is a foraminous or screen partition 9 to the center of which and directly above the inlet 7 is attached an imperforate plate 10. A series of baffles 11 and 12 are disposed in the upper portion of the lower compartment B above the normal liquid level. Also in the upper portion of the lower compartment, and preferably above the uppermost of the baffles, is an opening 13 to which may be connected a relief valve R by means of a fitting 15. The relief valve is adapted to discharge into the atmosphere through a pipe 16.

The hydraulic back-pressure arrester of Figs. 1 and 2 is shown in Fig. 3 as it may be applied to a commercial type of acetylene generator. The generator of Fig. 3 comprises a superstructure E containing a carbide hopper and feed apparatus usual in such generators, and a tank F containing a body of water into which the carbide is fed to generate acetylene. The generated acetylene passes from the generating chamber into a pipe 21 which connects with the inlet 4 of the hydraulic back-pressure arrester H, shown in detail in Figs. 1 and 2. The arrester may be installed in a chamber in the superstructure E, a door 23 of this chamber being opened to reveal the hydraulic arrester. The outlet 14 of the hydraulic arrester is connected to a pipe 22 which in turn is normally connected with the acetylene supply line (not shown).

The operation of the apparatus is as follows: When the acetylene generator is first started or is supplying a light load, the acetylene flows through pipe 21 and into the upper compartment A, then through this compartment and the pipe K to the lower compartment B. Upon encountering the check valve V the pressure of the gas in the generator will force the check valve open and the acetylene will bubble up through the water in the lower compartment B. The acetylene is forced to pass upwardly around the edge of the plate 10, thereby preventing the gas from passing in a straight vertical line from the inlet 7 directly through the liquid; and the screen 9 will break up any large bubbles of liquid tending to be carried by the gas, thus reducing the amount of moisture entrained in the gas. The gas will then pass along the zig-zag path provided by the baffle plates and drop any remaining entrained moisture, which will be precipitated on the baffles and will drain back into the body of water.

At light loads the gas will bubble through the water with a quiet effervescence, but upon an increase of load more and more acetylene will pass through; the velocity of the acetylene will increase; the water will become more disturbed and finally become violently agitated and tend to project itself into the acetylene supply line. This condition will be true at normal loads, and to prevent the splashing of water into the supply line, the deflector plate 10 will divert the gas to the periphery thereof where the screen will break up any large bubbles and effectively prevent splashing. The central plate primarily prevents a geyser effect directly above the inlet which would violently force water through the central portion of the screen. The baffle plates 11 and 12 in the upper portion of the compartment B will remove entrained moisture and also deflect back into the body of water any liquid which may splash up at the sides.

When the acetylene generator is opened for recharging, or if for any other reason the pressure at the outlet 14 becomes greater than the pressure at the inlet 4, the water will provide a seal between the outlet 14 and the acetylene generator. In case such back pressure is continued for a long period of time, even a slight leakage of water through the check valve V will fill the pipe K and tend to fill the upper compartment A. The combined capacity of the pipe K and the compartment A is at least as great as the greatest volume of sealing liquid normally contained in the compartment B. The relief valve R, which opens automatically at a predetermined high pressure, will discharge directly into the atmosphere through the pipe 16 any excessive or sudden influx of gases projected back into the arrester due to an explosion in the supply line or other causes. In the case of a flash-back or explosion in the supply line the water always provides a seal between the supply line and the generator.

When the back pressure drops, the acetylene from the generator will force the water out of the compartment A, through the pipe K and check-valve V, and back into the compartment B. The hydraulic arrester will then function in its normal manner during delivery of gas to the supply line, as explained above.

While this invention has been explained in reference to a particular type of generator and the embodiment has been set forth in detail, it will be understood that the apparatus can be applied to any acetylene generator or similar apparatus, and also that changes may be made in the particular structure without departing from the principles of this invention.

What is claimed is:

1. A hydraulic back-pressure arrester comprising a casing containing sealing liquid through which gas is adapted to rise; and means disposed in said casing to subdivide the gas stream issuing from the sealing liquid and to break up bubbles rising therefrom, said means being disposed at the normal liquid level or at a sufficiently small height thereabove to prevent undesirable splashing.

2. In a hydraulic back-pressure arrester, the combination of a container adapted to hold a body of sealing liquid in its lower portion and having an inlet at its lower end and an outlet at its upper end, said container being adapted to permit the flow of gas from said inlet through said body of liquid to said outlet; foraminous means disposed at the normal level of said body of liquid and adapted to break up large bubbles of liquid entrained by such gas; imperforate means associated with said foraminous means and adapted to prevent the direct vertical flow of gas through said liquid; and a plurality of baffles disposed between said outlet and the level of said body of liquid adapted to reduce the amount of liquid entrained in said gas while flowing through said container.

3. In a hydraulic back-pressure arrester, the combination of a container adapted to hold a body of sealing liquid in its lower portion and having an inlet adjacent its lower end and an outlet adjacent its upper end; means connected to said inlet adapted to permit the flow of a gas into said container through said inlet, such gas normally passing through said liquid and into the upper portion of said container; a screen disposed adjacent the normal level of said liquid and adapted to break up large bubbles of liquid entrained by such gas; and a plate disposed directly above said inlet and adjacent the normal level of said sealing liquid adapted to prevent the direct vertical flow of gas through said liquid from said inlet to the upper portion of said container.

4. A hydraulic back-pressure arrester comprising a casing having an upper compartment and a lower compartment adapted normally to hold a body of sealing liquid in its lower portion, the upper compartment having an inlet adjacent its upper end and an outlet adjacent its lower end, and the lower compartment having an inlet adjacent its lower end and an outlet adjacent its upper end; means connecting the outlet of the upper compartment and the inlet of the lower compartment for providing a passage between the compartments; means disposed in such connecting means normally tending to prevent the flow of a combustible gas from the lower compartment to the upper compartment when the gas pressure is greater at the outlet of the lower compartment than at the inlet of the upper compartment, the body of liquid serving as a seal between the outlet of the lower compartment and the inlet of the upper compartment to prevent gas from flowing into the upper compartment and out of the inlet thereof; and imperforate means disposed in the lower portion of the lower compartment adapted to prevent the direct vertical flow of the combustible gas through the body of sealing liquid.

5. A hydraulic back-pressure arrester comprising a casing having an upper compartment and a lower compartment adapted normally to hold a body of sealing liquid in its lower portion, the upper compartment having an inlet adjacent its upper end and an outlet adjacent its lower end, and the lower compartment having an inlet adjacent its lower end and an outlet adjacent its upper end; means connecting the outlet of the upper compartment and the inlet of the lower compartment for providing a passage between the compartments to permit a combustible gas normally to flow successively through the upper and lower compartments; means disposed in said connecting means and adjacent the inlet of the lower compartment normally adapted to prevent fluid flow from the lower compartment to the upper compartment when the gas pressure is greater at the outlet of the lower compartment than at the inlet of the upper compartment; and imperforate means disposed in the lower portion of the lower compartment adapted to prevent the direct vertical flow of the combustible gas through the body of sealing liquid.

6. A hydraulic back-pressure arrester comprising a casing having an upper compartment and a lower compartment adapted normally to hold a body of sealing liquid in its lower portion, the upper compartment having an inlet adjacent its upper end and an outlet adjacent its lower end, and the lower compartment having an inlet adjacent its lower end and an outlet adjacent its upper end; means connecting the outlet of the upper compartment and the inlet of the lower compartment for providing a passage between the compartments to permit a combustible gas normally to flow successively through the upper and lower compartments; means disposed in the lower compartment adjacent the normal level of the body of sealing liquid adapted to provide a plurality of small passages for the combustible gas immediately after passage through the body of sealing liquid; and imperforate means disposed in the lower portion of the lower compartment adapted to prevent the direct vertical flow of the combustible gas through the body of liquid from the inlet of the lower compartment to the upper portion thereof.

7. A hydraulic back-pressure arrester comprising a casing having an upper compartment and a lower compartment adapted normally to hold a body of sealing liquid in its lower portion, the upper compartment having an inlet adjacent its upper end and an outlet adjacent its lower end, and the lower compartment having an inlet adjacent its lower end and an outlet adjacent its upper end; means connecting the outlet of the upper compartment and the inlet of the lower compartment for providing a passage between the compartments normally to permit a combustible gas to flow successively through the upper and lower compartments; a check-valve disposed in said connecting means and adjacent the inlet of the lower compartment normally adapted to prevent fluid flow from the lower compartment to the upper compartment when the gas pressure is greater at the outlet of the lower compartment than at the inlet of the upper compartment; means disposed in the upper portion of the lower compartment for providing a circuitous path for the combustible gas to reduce the amount of liquid entrained in the combustible gas due to passage of the combustible gas through the body of sealing liquid; screen means disposed in the lower compartment adjacent the normal level of the body of sealing liquid adapted to provide a plurality of small passages for the combustible gas immediately after passage through said body of liquid; and a plate disposed in the lower portion of the lower compartment directly above the inlet thereof and adapted to prevent the direct vertical flow of the combustible gas from the inlet of the lower compartment to the upper portion thereof.

CHARLES NESS.